Dec. 25, 1923.  
R. A. STEVENS  
1,478,683  
MACHINE FOR CUTTING THE POINTED ENDS FROM RODS  
Filed March 14, 1921    4 Sheets-Sheet 1

Dec. 25, 1923.  1,478,683
R. A. STEVENS
MACHINE FOR CUTTING THE POINTED ENDS FROM RODS
Filed March 14, 1921  4 Sheets-Sheet 2

Royal A. Stevens
INVENTOR.

BY
Gardner W. Pearce
ATTORNEY.

Dec. 25, 1923.

R. A. STEVENS 1,478,683

MACHINE FOR CUTTING THE POINTED ENDS FROM RODS

Filed March 14, 1921    4 Sheets-Sheet 3

Royal A. Stevens
INVENTOR.

BY

Gardner W. Pearson
ATTORNEY.

Dec. 25, 1923.  
R. A. STEVENS  
1,478,683  
MACHINE FOR CUTTING THE POINTED ENDS FROM RODS  
Filed March 14, 1921  4 Sheets-Sheet 4

Royal A. Stevens
INVENTOR
BY Gardner D. Pearson
ATTORNEY.

Patented Dec. 25, 1923.

1,478,683

UNITED STATES PATENT OFFICE.

ROYAL A. STEVENS, OF LOWELL, MASSACHUSETTS, ASSIGNOR TO W. H. BAGSHAW CO., INC., OF LOWELL, MASSACHUSETTS, A CORPORATION OF MASSACHUSETTS.

MACHINE FOR CUTTING THE POINTED ENDS FROM RODS.

Application filed March 14, 1921. Serial No. 452,392.

*To all whom it may concern:*

Be it known that I, ROYAL A. STEVENS, a citizen of the United States, residing at Lowell, in the county of Middlesex and State of Massachusetts, have invented certain new and useful Improvements in Machines for Cutting the Pointed Ends from Rods, of which the following is a specification.

This invention relates to machines for cutting the ends from wire rods. It relates more particularly to machines for cutting the pointed ends from wire rods or wires to form phonograph and graphophone needles, hackle pins, gill pins, and other similar pins used in textile machinery.

Such pins are generally made by sharpening or pointing the end of a straight wire rod, and then cutting the pointed end the length desired.

In order that the pins may, when finished, be of an exact length, it is desirable that the butt ends of the pointed end or pin, after it is cut from the body of the rod, shall be smooth, without any bevel, burr, or other defect, and squarely at right angles to the axis of the rod.

It is also desirable that this cutting should be done rapidly, and that the feed should be so arranged that any rods which are not straight will be refused by the feed mechanism and can readily be thrown aside by the operator.

If there is a burr, shear, or bevel on the end of that part of the body of the rod which is left after cutting off the pointed end, no harm is done as this end will be ground down to a point, and any such defect will therefore disappear.

In the drawings, Fig. 1 is an elevation of my preferred form of machine shown in perspective from the side.

Figure 1:
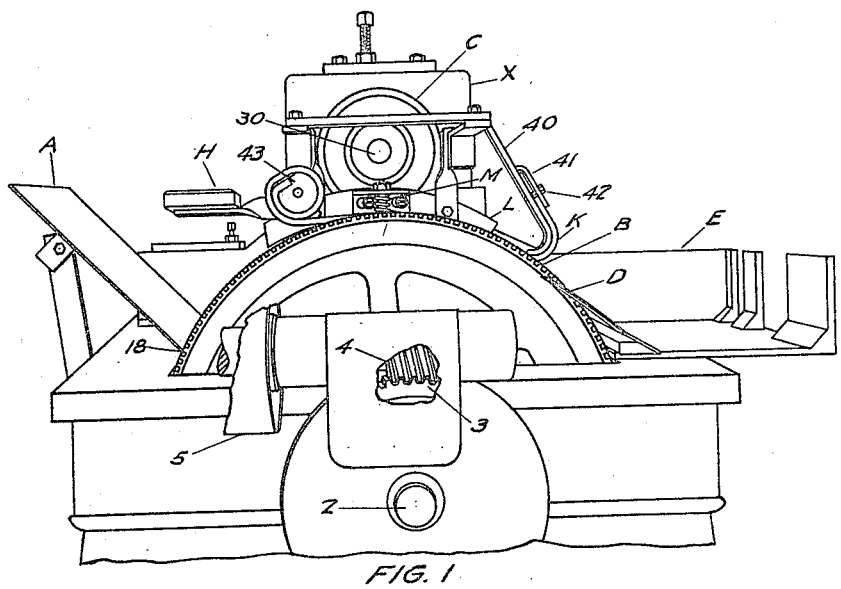
Figure 2:
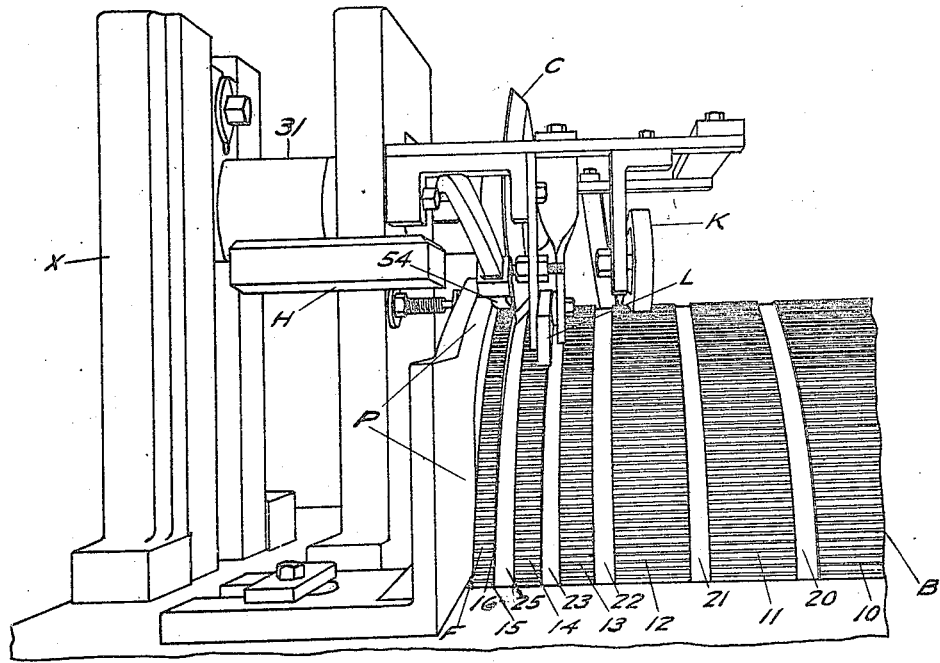
Fig. 2 is an elevation of the same machine shown in perspective from the front or feed end, with the feed apron removed to show the feed drum.

In the drawings, X represents the frame of the machine, and upon this frame, supported in any suitable manner, I may use a feed apron A disposed at such an angle that the rods G to be cut will be caused by gravity to roll down to the bottom edge 18, which should be a straight edge.

For the purpose of carrying along the rods to the cutting mechanism, I use a movable support, shown as a revoluble drum B having straight grooves 17, which are preferably formed like pockets the better to receive the rods, and are parallel with each other and parallel with the bottom edge 18 of feed apron A.

This feed drum B is shown as carried by shaft 2 carrying gear 3 driven by a worm 4, which is driven by a pulley 5 from any source of power.

The feed drum B is so positioned that its grooves or pockets 17 will be brought around from under the lower edge 18 of feed apron A so that they will successively each receive a rod G and carry it upward to the cutting mechanism position above it. With this construction, as the grooves 17 are straight and only very slightly larger than the diameter of the rods, if there is a bent rod only a part of it can enter a groove and it will tip over and over until the operator's attention is called to it, when he can pick it out and remove it.

Circumferentially around the drum proper, the grooves 17 are cut away at 20, 21, 22, 23 and 25, so that the series of grooves is broken into sections 10, 11, 12, 13 and 14, and into a section 15 which carries the pointed ends.

On the other side of drum B from apron A, I provide plow fingers D attached to the rod delivery box E, and so positioned that they extend down at an angle each into a groove 20, 21, 22, 23, 25, whereby, when released by the various guides, the bodies of the rods after the ends are cut off are plowed out of grooves 17 and delivered in the box E.

In the construction shown in Fig. 1 to Fig. 11, I show a support F to receive the pointed ends of the rods, which may be integral with drum B or preferably in the form of segments which can be attached to or detached from drum B by means of screws 6. This point support F, considered as a whole, has a cutting edge 16 at right angles to the rod axis and facing in the opposite direction to the points when the rods are being delivered to the cutter and being cut. Point support F has grooves which may be considered a continuation of the grooves or pockets 17 in the body of drum B, and the edge 16 is a cutting edge which co-operates with a cutting member C which has a cutting edge parallel with and proximate thereto, and is shown as a disc C carried by shaft 30 free to revolve in bearings 31 attached to frame X. As the cutting edges of revoluble disc cutter C and edge 16 are parallel, the cut which they make on the butt end of each pin will be clean, without burr, shear, or bevel, and it is manifest that cutter C will crawl as the cutting proceeds, thus presenting the whole of its circumference to the cutting edge whereby resharpening will be reduced.

It is also clear that the entire circumference of the edge 16 will be brought into play as a cutting edge, and that when it becomes dull, the segments of point support F can readily be removed and resharpened or replaced by other segments.

To position the rods and hold them in position while being cut and delivered, I use several mechanisms which I will now describe.

The operator takes a bundle of rods from any suitable receptacle, and first holds them point down on the point evener plate H, shaking them so that the points will be nearly even. He then places them on the apron A with the points up against or close to the point gauge P which, starting at a point opposite the bottom edge 18 of apron A, curves upward toward the pointed end support F in such manner that, as the rods are carried upward, the pointed ends are evened.

In the position where the point gauge P ends, I locate a rigid body guide L, preferably made of metal, which extends up along over the curved section 14 past the cutting point and so close to the drum B that it will come in contact with the top of the rods G.

Figure 5:
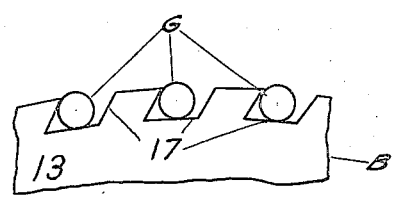
Fig. 5 is an enlarged diagrammatic elevation of part of drum B, with the grooves therein and rods much enlarged.

Preferably, the grooves or pockets 17 should not be quite as deep as the diameter of rods G, so that the rods will project slightly from the grooves, and will therefore come in contact with body guide L and the other guides to be described, as see Fig. 5.

Beginning at a point preferably a little beyond rigid body guide L, I prefer to provide an elastic body guide K which consists of a strip of elastic material, such as rubber, supported at the delivery end by a curved metal arm 40 which preferably has a take-up clamp 41 operative by screw 42, and at the feed end wound on a spool 43 whereby, as it is worn, it can be taken up. This elastic guide is shown as extending over the section 12, and its purpose is to prevent the free end of the rods from kicking up.

Attached to body guide L, I prefer to use a pressure foot M shown as comprising a shoe 44 the bottom of which is cut to the circumference of drum B, and which is carried by an arm 45 slidable in suitable bearings 46 carried by a bracket 47 attached by means of adjusting screws 48 which pass through slots 49 to guide L. A powerful spring 50 keeps pressure foot M firmly in contact with the top of the rods G in grooves 17 while the cutting is actually going on.

It is necessary to hold the rod on both sides of the cutting devices, and besides the guides just described, I prefer to use a point-holding guide O shown as consisting of a rubber band 53 attached at the feed end to the frame by a suitable screw 55 and as having underneath, from this end up to the cutting point, a steel spring 54 which holds the pointed ends firmly but elastically in position while being cut. The other end of this point-holding guide O extends along over the point support F, preferably down through a slot 56 in delivery box E to which it is attached by a screw 57 whereby it guides the pointed ends after they are cut, and keeps them in the grooves of point support F until they are carried down under delivery box E, whence they will be dropped out by gravity on to the floor or into any suitable receptacle.

The various guides and gauges may be made adjustable by screws in any well known manner.

Figure 10:
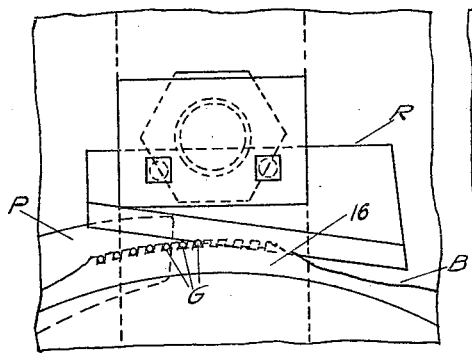
Fig. 10 is a diagrammatic elevation from the side, and Fig. 11 a diagrammatic elevation, partly in section, viewed from the feed end of a modification of my machine.
Figure 11:
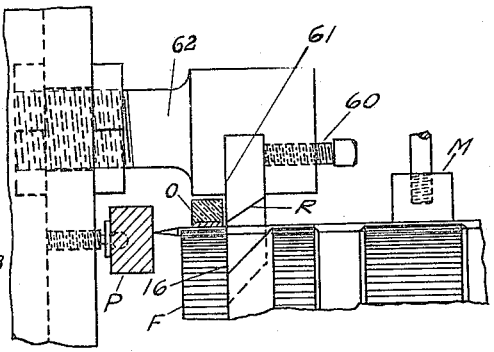

As shown in Figs. 10 and 11, instead of using a crawling disc cutter, such as C, which will continue to present a new cutting surface, I may use a fixed cutting member, shown as a knife R, which may be adjustable by means of screws 60. 62. and which has a cutting edge 61 parallel with and proximate cutting edge 16 on the point support F. The other edge of knife R may be beveled, as is the other edge of cutter C, as the cutting of a bevel or burr on the body of the rod is immaterial because it will be ground off when the end of this body or stub is ground down to a point to form another needle.

Figure 12:
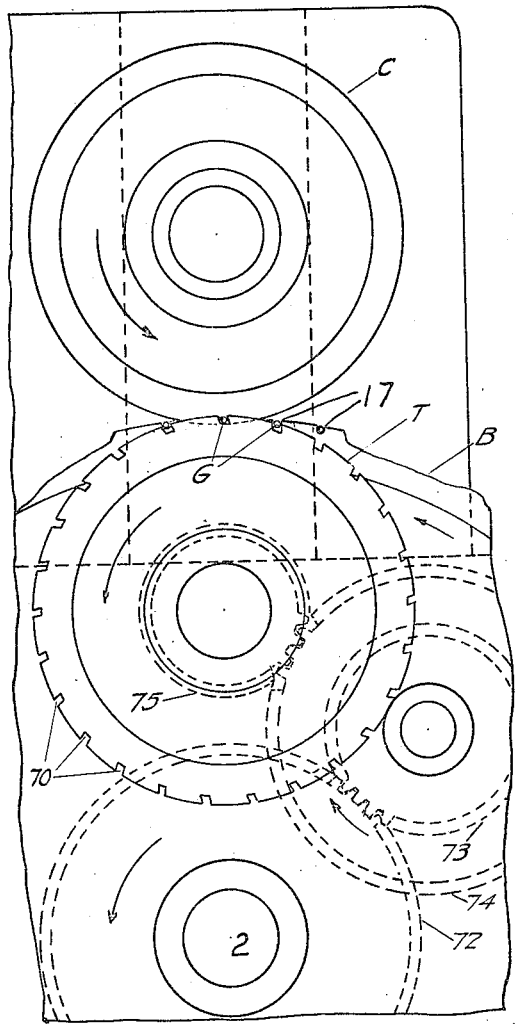
Fig. 12 is a diagrammatic side elevation, and Fig. 13 a diagrammatic elevation from the feed end, partly in section, of another modification of my machine.
Figure 13:
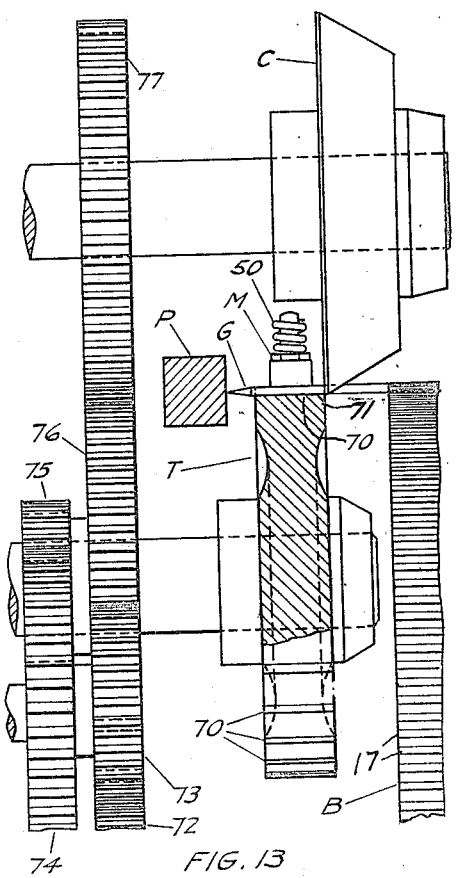

As shown in Figs. 12 and 13, I may use a feed drum B, cutting disc C, and the same type of guides and gauges as described, but in place of an end support, such as F, integral with feed drum B, I may use a fluted cutter T having grooves 70 of the same size and shape and positioned relatively the same as grooves 17 on drum B.

At the cutting point, and a little before, point support T should have its grooves 70 positioned so as to coincide with grooves 17 so that, as the rods G are carried up, as shown in Fig. 12, the pointed ends will fall into the grooves 70 and be carried along until cut between the cutting edge 71 of support T and the cutting edge of disc cutter C.

The point support T and disc cutter C might be loose upon their respective shafts, point support T being revolved by the engagement of the pointed ends of the rod with the grooves 70, but it is preferable to have both positively driven by means of a train of gears 72, 73, 74, 75, which will give T and C the same surface speed as drum B at the point of contact, while gears 76 and 77 drive cutter C.

Figure 14:
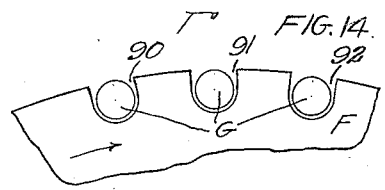
Fig. 14 is a detail showing my preferred form of point support grooves.
Figure 3:
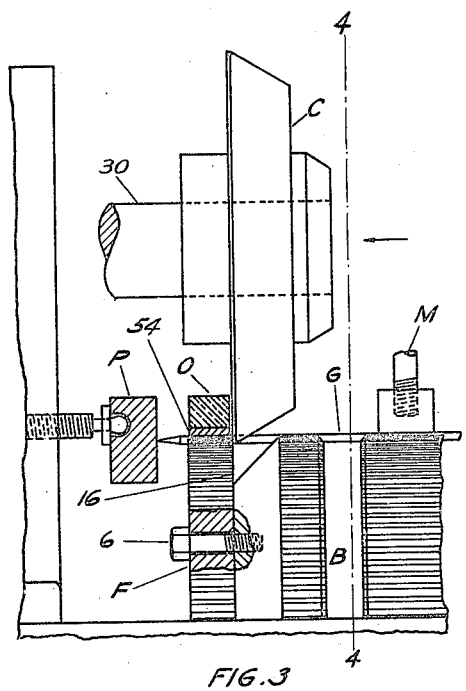
Fig. 3 is a detail, partly in section, showing the point support, cutting disk, point guide, and adjoining part of feed drum.
Figure 4:
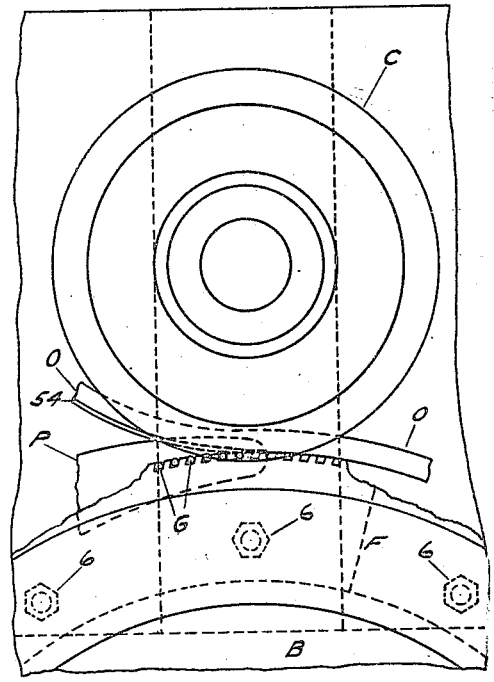
Fig. 4 is a diagrammatic view to show the relation of the parts in Fig. 3, looking in the direction of the arrow on line 4—4, cross-hatching being omitted on the drum B for clearness.

For the grooves to receive the pointed ends of the rods for the point support, I may use grooves with sides forming angles with each other, but as there is a tendency for the metal at the butts in being cut to be crowded into such angles and distorted, I prefer to use curved grooves, such as shown at 90, 91, 92 in Fig. 14. These may be of different shapes, but preferably fit as snugly as possible the back side of each rod G as that is where the pressure comes in cutting. Each groove may be from twenty to fifty per cent larger than the diameter of the rod.

Figure 15:
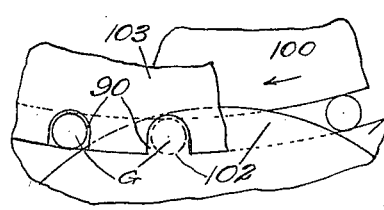
Fig. 15 is a diagrammatic detail view showing still another arrangement of my feeding and cutting parts.
Figure 6:
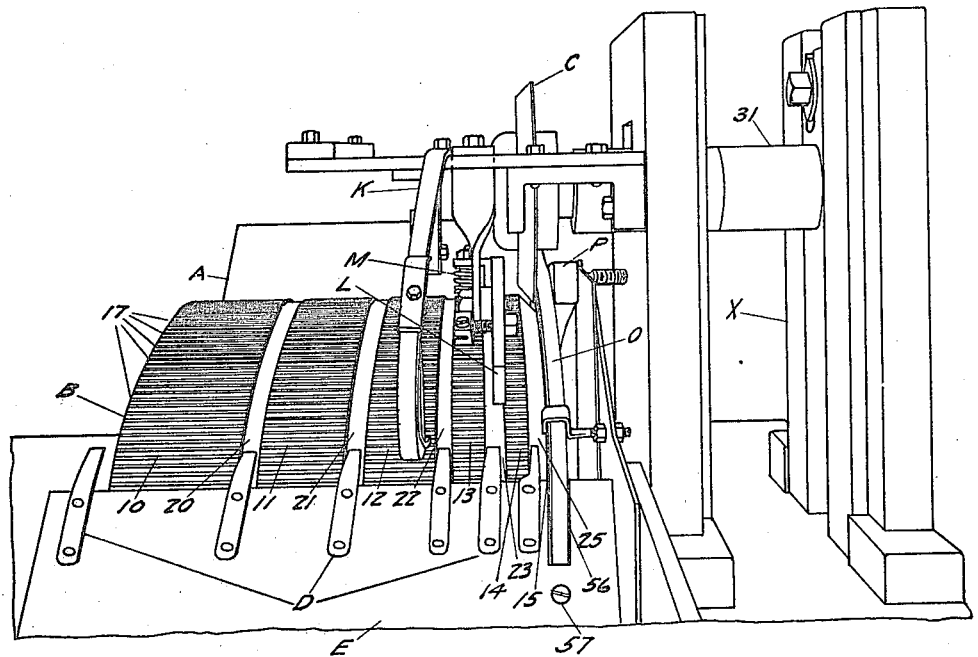
Fig. 6 is an elevation in perspective of the delivery end of the machine shown in Figs. 1 and 2.
Figure 7:
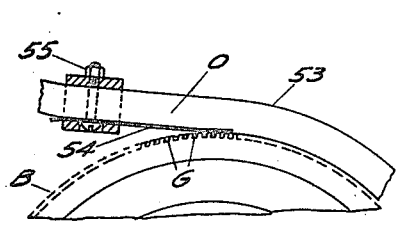
Fig. 7 is a detail showing the point holding guide.
Figure 8:
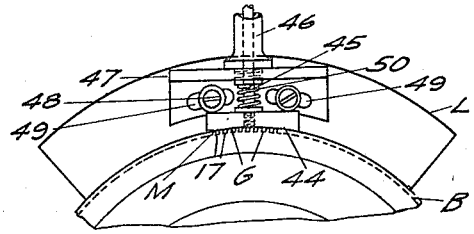
Figs. 8 and 9 are details showing the construction of the rigid body guide and the pressure foot.
Figure 9:
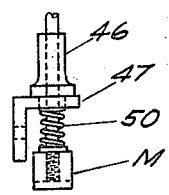

As shown in Fig. 15, I may use a movable support 100 for the bodies of the rods which is similar to drum B but has no grooves. Under this, I may use a fixed saddle 101, between which and 100 the rods move preferably downward from the feeding point.

Movable with body support 100 is what corresponds to the support for the pointed ends shown at 103 formed with receiving grooves 90. 102 is a cutter, which may be a crawling disk cutter or may be stationary, but which has a cutting edge at right angles to the rod axis and facing in the opposite direction to the points, and proximate to the cutting edge of point support member 103. Such a device embodies my most important feature, which is the point support with the cutting edge at right angles to the rod axis, and facing in the opposite direction to the points, in combination with a cutter which has a cutting face parallel to and cooperating therewith.

I claim:

1. In a machine for cutting the pointed ends from rods, the combination of a feed apron, with a drum having straight, parallel grooves to receive the bodies of the rods and movable upward from said feed apron, with a support having grooves to receive the pointed ends of the rods movable with the body support and having a cutting edge at right angles to the rod axis and facing in the opposite direction to the points, a guide to hold the pointed ends firmly on said point support, a guide to hold the bodies firmly on said drum, and a disk shaped metal shearing member so mounted as to be revoluble, having a cutting edge parallel with and proximate to the cutting edge of said end support.

2. In a machine for cutting the pointed ends from rods, the combination of a feed apron, with a drum having straight, parallel grooves to receive the bodies of the rods and movable upward from said feed apron, with a support having grooves to receive the pointed ends of the rods movable with the body support and having a cutting edge at right angles to the rod axis and facing in the opposite direction to the points, a guide to hold the pointed ends firmly on said point support, a guide to hold the bodies firmly on said drum, and a cooperating metal shearing member having a cutting edge parallel with and proximate to the cutting edge of said end support.

3. In a machine for cutting the pointed ends from rods, the combination of a drum having straight, parallel grooves to receive the bodies of the rods and movable upward from the feed point, with a support having grooves to receive the pointed ends of the rods movable with the body support and having a cutting edge at right angles to the rod axis and facing in the opposite direction to the points, a guide to hold the bodies firmly on said drum, and a cooperating metal shearing member having a cutting edge parallel with and proximate to the cutting edge of said end support.

4. In a machine for cutting the pointed ends from rods, the combination of a movable support having straight parallel grooves to receive the bodies of the rods, with a support having grooves to receive the pointed ends of the rods movable with the body support and having a cutting edge at right angles to the rod axis and facing in the opposite direction to the points, a guide to hold the pointed ends firmly on said point support, and a cooperating metal shearing member having a cutting edge parallel with and proximate to the cutting edge of said end support.

5. In a machine for cutting the pointed ends from rods, the combination of a movable support for the bodies of the rods, with a movable support for the pointed ends having a cutting edge at right angles to the rod axis and facing in the opposite direction to the points, a guide to hold the pointed ends firmly on said point support, and a cooperating metal shearing member having a cutting edge parallel with and proximate to the cutting edge of said end support.

6. In a machine for cutting the pointed ends from rods, the combination of a movable support for the bodies of the rods, with a support for the pointed ends having a cutting edge at right angles to the rod axis and facing in the opposite direction to the points, and a cooperating metal shearing member having a cutting edge parallel with and proximate to the cutting edge of said end support.

7. In a machine for cutting the pointed ends from rods, the combination of a movable support having straight parallel grooves to receive the bodies of the rods, with a support having curved grooves to receive the pointed ends of the rods movable with the body support and having a cutting edge at right angles to the rod axis and facing in the opposite direction to the points, a guide to hold the pointed ends firmly on said point support, and a cooperating metal shearing member having a cutting edge parallel with and proximate to the cutting edge of said end support.

8. In a machine for cutting the pointed ends from rods, the combination of means for advancing the bodies of the rods with a support having curved grooves to receive the pointed ends of the rods movable with said advancing means and having a cutting edge at right angles to the rod axis and facing in the opposite direction to the points, a guide to hold the pointed ends firmly on said point support and a cooperating cutting member having a metal shearing edge parallel with and proximate to the cutting edge of said end support.

9. In a machine for cutting the pointed ends from rods, the combination of a feed apron, with a drum having straight, parallel grooves to receive the bodies of the rods and movable upward from said feed apron, with a support having grooves to receive the pointed ends of the rods movable with the body support and having a cutting edge at right angles to the rod axis and facing in the opposite direction to the points, a guide to hold the pointed ends firmly on said point support, a guide to hold the bodies firmly on said drum, a point guide in position to align the pointed ends before they reach the point guide and body guide, and a disk shaped metal shearing member so mounted as to be revoluble, having a cutting edge parallel with and proximate to the cutting edge of said end support.

ROYAL A. STEVENS.